United States Patent [19]
Mead et al.

[11] Patent Number: 5,332,529
[45] Date of Patent: Jul. 26, 1994

[54] ELECTRIC DISCHARGE MACHINE PROCESS AND FLUID

[75] Inventors: Theodore C. Mead; Douglas H. Culpon, Jr., both of Port Neches, Tex.

[73] Assignee: Texaco Inc., White Plains, N.Y.

[21] Appl. No.: 846,106

[22] Filed: Mar. 5, 1992

[51] Int. Cl.$^5$ .............. H01B 3/24; H01B 3/20; B23H 1/08
[52] U.S. Cl. ................... 252/570; 252/578; 252/579; 219/69.14
[58] Field of Search .......... 252/570, 578, 579, 407; 174/171.4; 219/69.14

[56] References Cited
U.S. PATENT DOCUMENTS

| | | | |
|---|---|---|---|
| 3,639,275 | 2/1972 | Stayner | 219/69.14 |
| 3,648,013 | 3/1972 | Stayner et al. | 219/69.14 |
| 3,679,857 | 7/1972 | Stayner | 219/69.14 |
| 5,021,179 | 6/1991 | Zehler et al. | 252/54.6 |
| 5,076,814 | 12/1991 | Hanlon et al. | 252/407 |

Primary Examiner—Paul Lieberman
Assistant Examiner—Nicholas Ogden
Attorney, Agent, or Firm—James L. Bailey; Kenneth R. Priem; Richard A. Morgan

[57] ABSTRACT

An electric discharge machine fluid has been discovered. The fluid comprises a naphthene oil and 0.15 to 0.50 wt % 1,6-hexamethylene bis(3,5-ditertiarybutyl-4-hydroxycinnamate). The fluid was found to increase the breakdown voltage of the fluid and to stabilize oxidative deterioration.

14 Claims, 2 Drawing Sheets

- NAPHTHENE OIL
+ FLUID OF EXAMPLE 3

- NAPHTHENE OIL
+ FLUID OF EXAMPLE 3

ELECTRIC DISCHARGE MACHINE PROCESS AND FLUID

BACKGROUND OF THE INVENTION

1. Field Of The Invention

The invention relates to an electric discharge machining process. More particularly the invention relates to a dielectric fluid which is applied in the process to both a workpiece and an electrode. The invention is also a dielectric fluid.

2. Description Of The Related Art

The electric discharge machining process is a method of cutting and working metals which are difficult to form by more conventional metal forming processes. The process is used to shape extremely hard brittle metals into precision parts.

In the electric discharge machining process a cathodic electrode is brought into close proximity with the workpiece which is the anode. Cathode and workpiece are submerged in a dielectric fluid with a predetermined gap maintained between the two. A voltage is applied in an amount exceeding the breakdown voltage of the dielectric fluid and a series of arcs are struck across the gap through the fluid at a frequency of 20,000 to 300,000 per second. The electric arc erodes the surface of the workpiece. By this erosion the workpiece assumes the shape of a mirror image of the proximate surface of the cathode. By selection of the cathode surface shape, corresponding surfaces are shaped on the hard brittle anode which cannot practically be obtained by other machining processes. The method is particularly effective for making small cavities, piercing, trepanning and similar operations on tools and dies. For example, precision square holes can be formed to a preselected depth.

The quality of the machined article can be improved by flushing the anode surface with the dielectric fluid to remove debris generated by the electric arc erosion. The stream of fluid is directed at the point from which the electric arc is generated for greatest effectiveness. This results in a rapid degradation of the fluid. Improvements to the process have come by way of improvements in the degradation stability of the dielectric fluid.

Dielectric fluids are known in the art. Dielectric fluids which have been used for electric discharge machining include paraffinic mineral oil, naphthenic mineral oil, kerosene, glycols, silicone oils and water. The suitability of a fluid for use in the process is judged primarily on the insulating dielectric barrier provided by the fluid between the electrode and the workpiece; and on the ability of the fluid to pass high-peak discharge currents when ruptured at breakdown voltage. The dielectric fluid must also be relatively non volatile at operating temperature; have a low viscosity for fluidity, particle settlement and convective cooling. The fluid must retain these characteristics even under degradation in the environment of an electric arc. Accordingly, there is a need in the art for a dielectric fluid which is of high dielectric strength, is non corrosive, is free of objectionable odor, evolves minimal smoke and is particularly resistant to oxidation.

Phenolic compounds have been used in fluids for their oxidative stability. For example, 1,6-hexamethylene bis(2,6-ditertiarybutyl-4-hydroxyhydrocinnamate) is offered for sale as an antioxidant under the tradename IRGANOX ® L109 by Ciba Geigy Corporation. The manufacturer suggests this compound for combination with synthetic or mineral oils to formulate compressor oils, turbine oils, FDA white oils and grease.

U.S. Pat. No. 4,444,676 to G. L. Stratton et al. discloses phenolic antioxidants for polyoxyalkylene polyether polyols and polyurethane foams prepared therefrom. The phenolic antioxidants include 1,6-hexamethyl bis(3,5-ditertiarybutyl-4-hydroxycinnamate).

U.S. Pat. No. 4,427,563 to D. A. Hutchison discloses phenolic antioxidants for stabilizing hydrocracked lubricating oils. For example, 4,4'-bis(2,6-ditertiarybutyl phenol) is employed to inhibit deterioration due to light.

Electric discharge machines and operating conditions are described in U.S. Pat. No. 5,051,554 to A. T. Tsukamoto; U.S. Pat. No. 5,041,709 to R. J. Schneider et al. and U.S. Pat. No. 4,717,803 to J. Alexandersson all incorporated herein by reference.

SUMMARY OF THE INVENTION

The invention is an improvement in an electric discharge machining process. In the electric discharge machine process a metallic workpiece is machined by electric discharge generated across a gap between the workpiece and an electrode. The gap is filled with a dielectric fluid which contacts both the workpiece and the electrode. In the improvement the dielectric fluid comprises a major portion of a mineral oil and a phenolic compound of the formula:

$$R-(CH_2)_y-COO(CH_2)_x COO(CH_2)_y-R$$

wherein:

R is a ditertiarybutyl-4-hydroxyphenyl radical, x ranges from 4 to 12, and y ranges from 1 to 3.

The phenolic compound has been found to increase the dielectric strength of the dielectric fluid and to impart stability to oxidation.

DETAILED DESCRIPTION OF THE INVENTION

Figure 1:
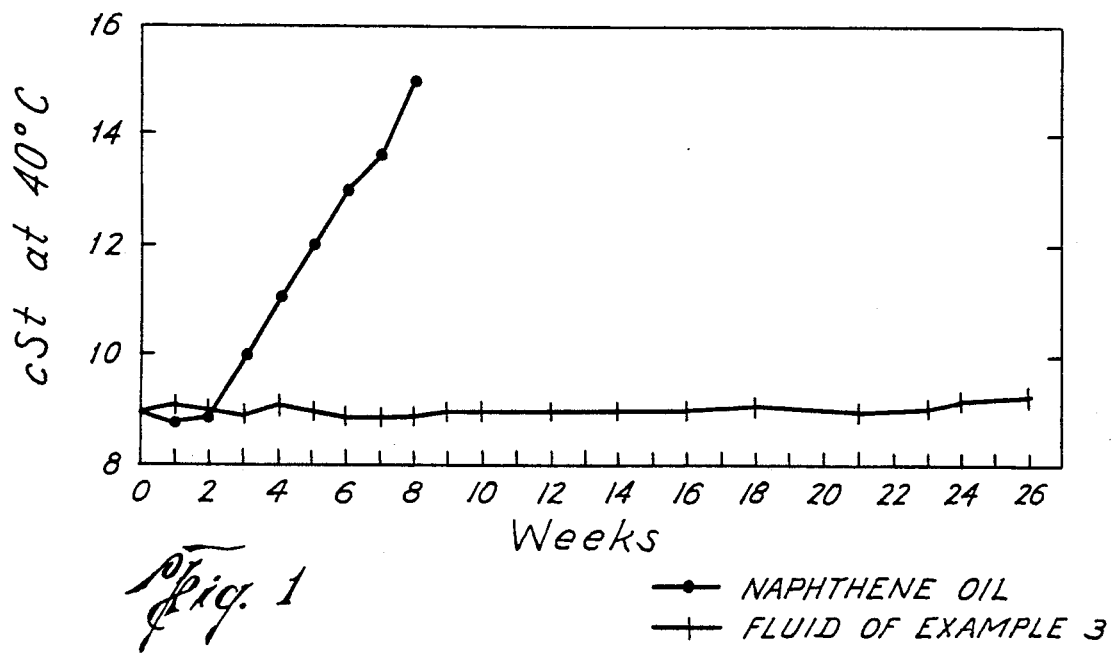
FIGS. 1–4 are plots of data described in the Example.

The invention is an improvement in an electric machining process. The improvement is characterized by a dielectric fluid which demonstrates increased dielectric strength and prolonged useful life. The dielectric fluids comprise a major portion of a mineral oil and a minor portion of a bis(ditertiarybutylphenol) derivative.

Petroleum based mineral oils are derived from waxy petroleum distillate oil stocks. Such waxy petroleum distillate oil stocks have a viscosity of less than 50 SUS at 100° F. and have a boiling range of about 600° F. to 650° F. (315° C. to 343° C.) initial boiling point to about 1050° F. to 1100° F. (566° C. to 593° C.) end point. Such waxy petroleum distillate oil stocks may be derived from raw lube oil stocks the major portion of which boil above 650° F. (343° C.). These raw lube stocks are vacuum distilled with overhead and side draw distillate streams and a bottom stream referred to as residual oil stock. Considerable overlap in boiling ranges of distillate streams and the residual stream may exist, depending upon distillation efficiency. Some heavier distillates have almost the same distribution of molecular species as the residual stream. Both paraffinic and naphthenic crude oils are used as sources of lube oil stocks.

Such distillate streams contain aromatic and polar compounds which are undesirable. Such compounds are removed by means such as solvent extraction or hydrogenation before or after solvent dewaxing.

The wax content of a waxy distillate oil stock is defined by the amount of material to be removed to produce a dewaxed oil with a selected pour point temperature in the range of about +25° F. to −40° F. (−3.9° C. to −40° C.). Wax content of waxy distillate oil stock will vary in the range of 5 wt % to 35 wt %. Distillate oil stock is dewaxed typically by solvent dewaxing, however catalytic dewaxing processes have been found which are industrially significant.

The dewaxed product is referred to as a lubricating oil base stock which is blended with other base stocks to achieve a viscosity in the range of 2 cSt to 500 cSt @40° C.

The preferred mineral oils are made from naphthenic crudes. The resulting naphthenic mineral oils have the following properties:

|  | MIN. | MAX. |
| --- | --- | --- |
| Viscosity, cSt @ 90° C. | — | 20 |
| Specific Gravity | 0.8 | 0.9 |
| Flash | 225° F. | — |
| Color, ASTM |  | 2.0 |
| Ash, wt % |  | 0.003 |
| Neut. No. |  | 0.1 |

The phenolic compounds of the dielectric fluids are characterized by the formula:

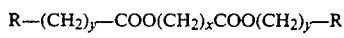

wherein:
R is a ditertiarybutyl-4-hydroxyphenyl radical,
x ranges from 4 to 12, and
y ranges from 1 to 3.
Preferably R is:
i. 2,6-ditertiarybutyl-4-hydroxyphenyl, or
ii. 3,5-ditertiarybutyl-4-hydroxyphenyl.
Preferably x is about 6 to 10, most preferably about 8.

The composition wherein x is about 8 and y is about 2 is commercially available. The compound 1,6-hexamethylene bis(3,5-ditertiarybutyl-4-hydroxycinnamate) is sold commercially under the tradename IRGANOX® L109 by Ciba Geigy Corporation, Hawthorne, N.Y.

The dielectric fluid is formulated by techniques, well-known in the art. The quantity of the bis-ditertiarybutylphenol derivative which will yield a 0.15 wt % to 0.50 wt % dielectric fluid is weighed out. The compound is a white to yellowish powder having a solubility of 1% in ISO V.G. 32 or lower mineral oil at 10° C. An amount of 55 pale stock comprising 5 to 10 wt % of the final composition is weighed out. 55 pale stock has a viscosity of 8 cSt @40° C. The oil is heated in a steam jacketed stainless steel kettle to about 60° F. to about 110° F. and the powder added with stirring in increments which completely dissolve in the oil. When all of the powder is dissolved mineral oil is added to bring the fluid to its desired concentration. The fluid is allowed to cool to room temperature and samples taken for quality control testing and for retention. The dielectric fluid is canned and labeled.

The dielectric fluid is installed in a machine by the same procedure as a regular fluid change. The reservoir is drained and flushed to remove all sludge and metal debris. The reservoir is wiped clean with a lint free cotton cloth. The reservoir is refilled by pouring the dielectric fluid into the work tank and allowing it to drain into the base. The machine is filled to the level of the sight gauge in the base. A refill typically requires about 110 gallons of fluid. The machine is restarted.

EXAMPLE 1

The dielectric fluid was formulated with 1,6-hexamethylene bis(3,5-ditertiarybutyl-4-hydroxycinnamate) in naphthenic lube oil of viscosity 5 to 15 cSt @40° C. The composition is available commercially as IRGANOX® L109 from Ciba Geigy Corp., N.Y. A 0.25 wt % composition and a 0.50 wt % composition were formulated and tested for dielectric breakdown according to ASTM D-877. The results were as follows:

| Composition | Breakdown Voltage |
| --- | --- |
| Naphthenic oil | 35 kilovolts |
| Naphthenic oil + 0.25 wt % L109 | 33 kilovolts |
| Naphthenic oil + 0.50 wt % L109 | 46 kilovolts |

The composition was found to increase the dielectric strength (breakdown voltage) of the dielectric fluid.

EXAMPLE 2

The breakdown voltage of dielectric fluid candidates were tested according to ASTM D-877. All of the fluids were in an amount of 0.5 wt % in naphthenic oil.

| Compound | Breakdown Voltage, kv |
| --- | --- |
| Naphthenic Oil | 35 |
| Alkylated diphenylamine | 30 |
| Mixture of ditertiarybutylphenol derivatives | 34 |
| Benzotriazole | 40 |
| Ocylated phenyl-α-naphthylamine | 33 |
| Hindered triphenylphosphate | 29 |
| Hindered phenol | 44 |
| Phenyl-α-naphthylamine | 39 |

EXAMPLE 3

A 27 week field test was conducted. The fluid of Example 1 in a concentration of 0.5 wt % was used in a commercial electric discharge machine. The naphthenic oil base fluid was used in a parallel field test. The dielectric fluids were sampled during the course of the field test. These samples were analyzed for viscosity by ASTM D-445, neutralization number by ASTM D-974 or D-664 and pentane insolubles (sludge) by ASTM D-4055. The results were recorded.

Figure 2:
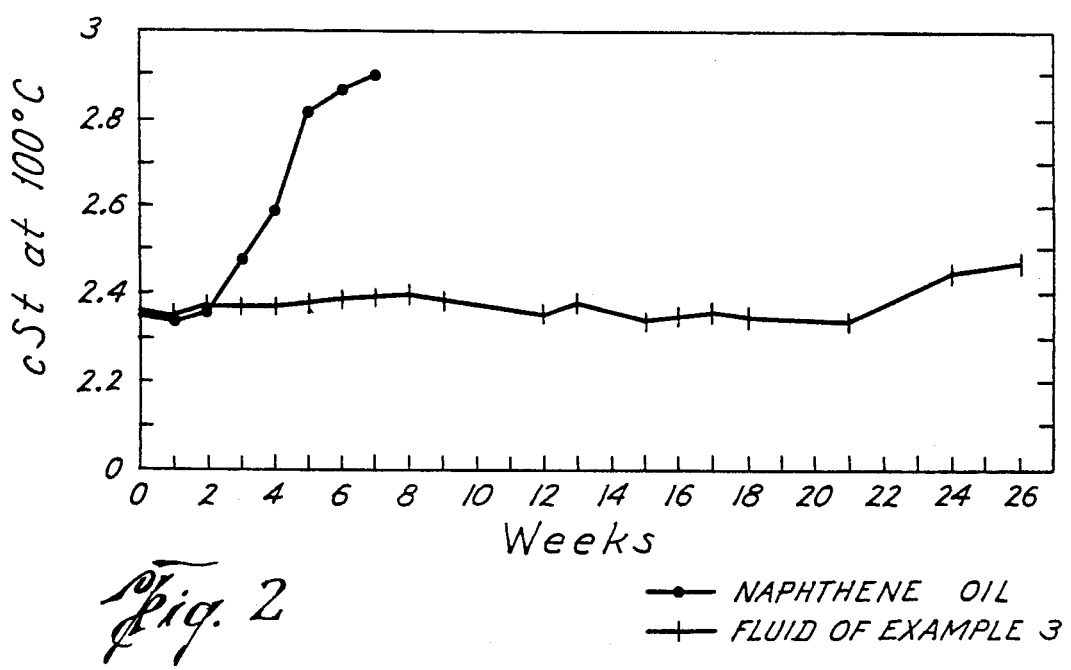

FIGS. 1 and 2 are plots of the viscosity data versus time which was recorded. FIG. 1 is the viscosity in cSt @40° C. FIG. 2 is the viscosity in cSt @100° C. As mentioned, constant viscosity is desirable in the electric discharge machine process to maintain fluid flow through the gap between electrodes. Increasing viscosity is a measure of fluid degradation such as by oxidation; this leads to the formation of polar acidic oxygenates which tend to be more viscous.

Figure 3:
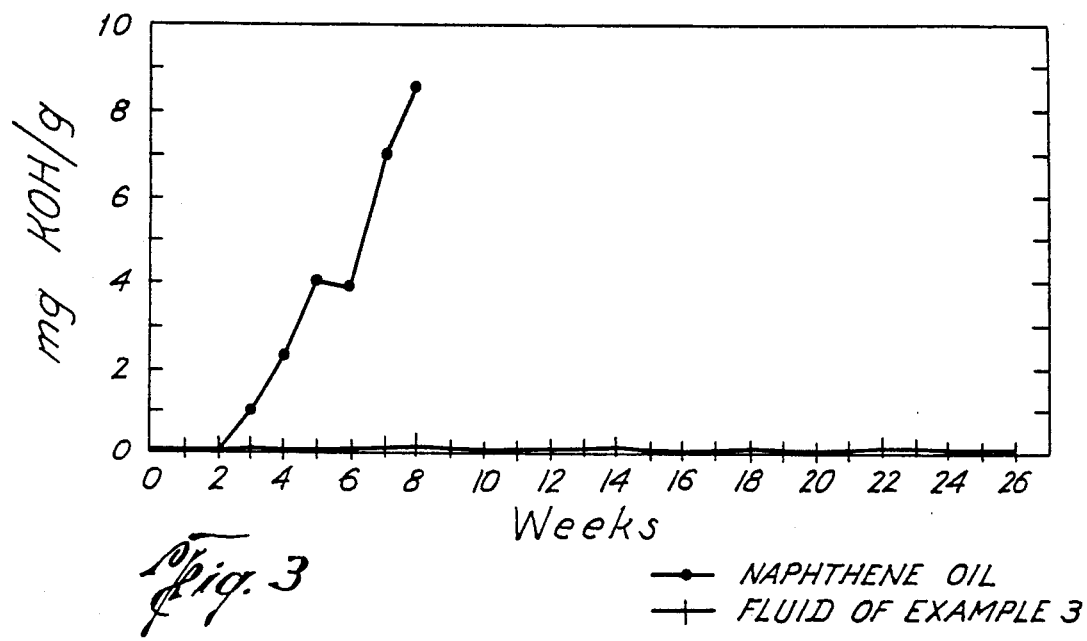

FIG. 3 is a plot of the neutralization number versus time. Neutralization number is a measure of the oxidative deterioration of the fluid. The fluid is oxidized to form acids. The concentration of acids is measured by titration with KOH. In industrial use, a dielectric fluid is discarded when the neutralization number rises to 5 or 10. In that range, the fluid does not prevent rust or corrosion and has lost its utility in the machining process.

Figure 4:
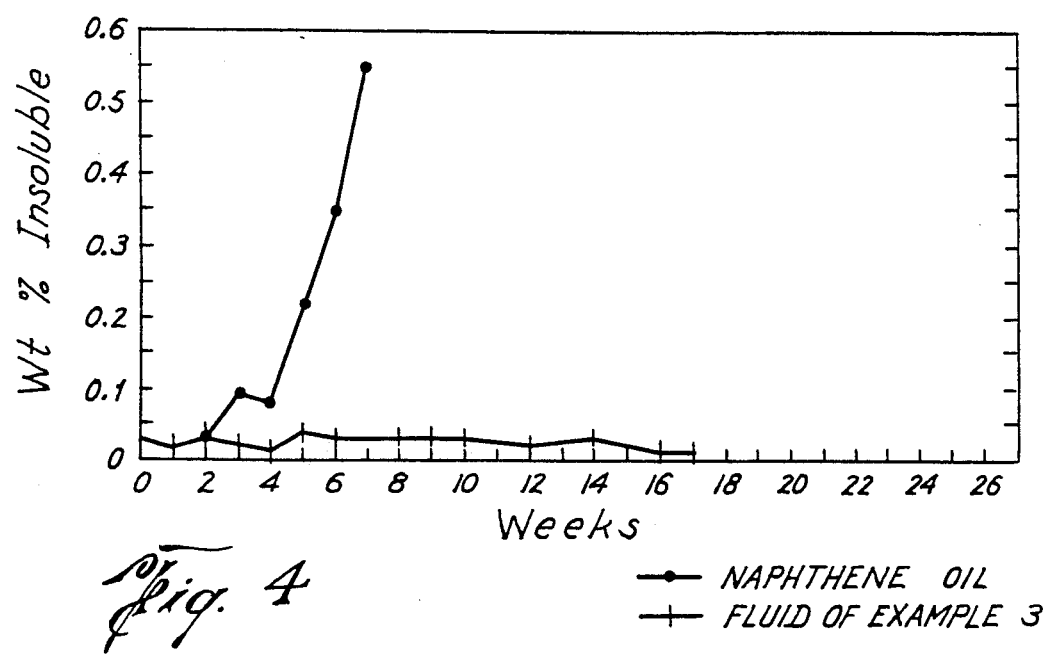

FIG. 4 is a plot of the data measuring pentane insolubles with time. Pentane insolubles are generally defined as sludge. The formation of sludge is a measure of the oxidative deterioration of the fluid. Sludge is undesirable in a machining fluid because it may block the close electrode gap. Blockage requires the process be stopped and the unit cleaned.

While particular embodiments of the invention have been described, it will be understood, of course, that the invention is not limited thereto since many modifications may be made, and it is, therefore, contemplated to cover by the appended claims any such modification as fall within the true spirit and scope of the invention.

What is claimed is:

1. An electric discharge machining process in which a workpiece is machined by an electric discharge generated between said workpiece and an electrode, and a dielectric fluid is applied to both of said workpiece and said electrode, characterized by:

said dielectric fluid comprising a major portion of a mineral oil and a minor portion of a phenolic compound of the formula:

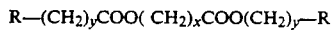

R—(CH$_2$)$_y$COO(CH$_2$)$_x$COO(CH$_2$)$_y$—R wherein:
R is a ditertiarybutyl-4-hydroxylphenyl radical,
x ranges from 4 to 12, and
y ranges from 1 to
wherein the phenolic compound comprises 0.5% or more by weight of the dielectric fluid.

2. The process of claim 1 wherein the phenolic compound comprises about 0.1 to 1 wt % of the dielectric fluid.

3. The process of claim 1 wherein x ranges from about 6 to 10.

4. The process of claim 1 wherein x is about 8.

5. The process of claim 1 wherein y is about 2.

6. The process of claim 1 wherein R is a 2,6-ditertiarybutyl-4-hydroxylphenyl radical.

7. The process of claim 1 wherein R is a 3,5-ditertiarybutyl-4-hydroxyphenyl radical.

8. The process of claim 1 wherein the mineral oil is a naphthenic mineral oil.

9. The process of claim 1 wherein the mineral oil is a naphthenic mineral oil having a viscosity of 5 to 15 cSt @40° C.

10. The electric discharge machining process in which a workpiece is machined by an electric discharge generated between said workpiece and an electrode, and a dielectric fluid is applied to both of said workpiece and said electrode, characterized by:

said dielectric fluid comprising a major portion of a naphthene mineral oil and 0.5 wt % to 1.0 wt % 2,6-hexamethylene bis-2,6-ditertiary-butyl-4-hydroxycinnamate.

11. The process of claim 10 wherein the naphthene mineral oil has a viscosity of 5 to 15 cSt @40° C.

12. A dielectric fluid composition comprising a major portion of a naphthene mineral oil having a viscosity of 5 to 15 cSt @40° C. and 0.5 to 1.0 wt % of a phenolic compound of the formula:

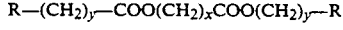

R—(CH$_2$)$_y$—COO(CH$_2$)$_x$COO(CH$_2$)$_y$—R wherein:
R is a ditertiarybutyl-4-hydroxylphenyl radical,
x ranges from 4 to 12, and
y ranges from 1 to 3.

13. The composition of claim 12 wherein R is a 2,6-ditertiarybutyl-4-hydroxylphenyl radical.

14. The composition of claim 12 wherein R is a 3,5-ditertiarybutyl-4-hydroxyphenyl radical.

* * * * *

UNITED STATES PATENT AND TRADEMARK OFFICE
CERTIFICATE OF CORRECTION

PATENT NO. : 5,332,529
DATED : July 26, 1994
INVENTOR(S) : Theodore Charles Mead
Douglas Holmes Culpon, Jr.

It is certified that error appears in the above-indentified patent and that said Letters Patent is hereby corrected as shown below:

Column 5, line 35, after "to" insert --3--.

Signed and Sealed this

Fourth Day of October, 1994

Attest:

BRUCE LEHMAN

Attesting Officer

Commissioner of Patents and Trademarks